3,009,978
PROCESS OF INCREASING ELECTRODE CAPACITY

Sidney A. Corren, 163 Cherry St., Katonah, N.Y.
No Drawing. Filed Feb. 9, 1959, Ser. No. 791,856
7 Claims. (Cl. 136—21)

This invention relates to porous electrodes for secondary batteries. More particularly it relates to methods of improving the electrical capacity of such electrodes.

In copending applications Serial Numbers 792,059 and 792,060, filed concurrently herewith, I have described processes for manufacturing electrodes for secondary batteries wherein the electrodes are built up from mixtures in slurry form. As described therein, in a preferred manufacturing procedure a metallic grid or screen is encased in a mixture containing chemically active and electrically conductive constituents, by application thereto of a slurry containing the ingredients and subsequent removal of the liquid from the resulting coated grid. Thereafter the plates may be compressed and the plate electrodes so-formed may then be assembled in secondary cells.

It has now been found that the electrical capacity of such electrodes, expressed in ampere hours per unit volume, may be substantially increased by compressing the product formed as described in the earlier applications in such amounts that the plate thickness is decreased to between 50% and 90% of the initial thickness and, for optimum increase in electrical capacity, to a final thickness which is between 60% and 80% of the initial thickness. The lower limit of plate thickness is determined by a tendency for embrittlement of the plate and for tearing during the rolling operation to be described hereinafter.

That the capacity per unit volume of a cell would be susceptible to an increase with decrease in volume is, of course, to be expected. However, as will be hereinafter described, the increase in electrical capacity, produced by compression of the individual plate electrodes, within described limits, has been found to be substantially greater than that attributable to the mere decrease in volume.

The use of pressure in the manufacture of electrodes for secondary batteries is known, but is generally incidental to the production of a more coherent article in the early stages of manufacture, e.g. by consolidation of loose constituents, and should not be confused with the present invention in which the compression is effected on a completed plate. Other known processes describe compression to improve retention of the active material or to improve bonding during sintering or for other purposes not related to the electrical capacity of the electrode.

In accordance with my invention the increase in electrical capacity may be obtained by compressing the plate in any of several ways. Thus it may be hot pressed between platens; or compressed between heated rolls; or preheated and then compressed; or it may be cold rolled, while wetted with water, or other liquids; but regardless of the method selected, the compression should be sufficient to decrease the volume of the electrode to between about 50% and 90% and preferably to about 75% of its original volume.

The following examples will serve to further illustrate my invention as applied specifically to nickel-cadmium alkaline batteries.

Negative electrodes were prepared as more fully described in the afore-mentioned application, Serial No. 792,059, filed of even date herewith, by forming a slurry composed of a uniformly blended mixture of cadmium oxide and cadmium (30:66) dispersed in a solution of a copolymer of polyvinyl chloride and polyvinyl acetate in methyl ethyl ketone and applying the slurry to a twenty-mesh nickel screen, by dipping the screen into the slurry, withdrawing the screen and drying it, and repeating the dipping and drying until the plates contained about 1.5 grams of material per square inch of plate. The resulting plate was then processed to increase its capacity in accordance with the present invention.

Plates were heated to about 100° C. in an oven and pressed between heated platens at about 225° F. to decrease the initial thickness from about 0.0265 inch to a final thickness of about 0.0195 inch. With heated rolls about 10 passes were usually required to reduce plates from about 0.030 to 0.040 inch thick to about 0.020 inch.

The effects of the first of the above treatments were to increase the plate's electrical capacity from 4.7 ampere hours per cubic inch to 8.0 ampere hours per cubic inch. The change in volume was such that the capacity would have been expected to be increased to about 6.4 ampere hours per cubic inch.

Thus the increase in volumetric capacity was nearly double what could have been expected from the decrease in volume alone.

Positive plates were prepared as more fully described in the afore-mentioned patent application, Serial No. 792,060, filed of even date herewith, by forming a slurry composed of (1) an electrically conductive plastic formed by mixing acetylene black with a copolymer of polyvinyl chloride and polyvinyl acetate dissolved in methyl ethyl ketone and thereafter incorporating nickel hydroxide therein, (2) a small amount of filter paper, and (3) a liquid vehicle comprised of benzine and methyl ethyl ketone and applying the slurry to a nickel screen grid. The slurry was applied by immersing the grid into the slurry, withdrawing the grid, drying and repeating the application until there was about 0.6 gram of material applied to each square inch of nickel mesh.

In accordance with the present invention, the plates were compressed the desired amount by being heated to about 100° C. in an oven and passed through a rolling mill for a sufficient number of passes to reduce an initial thickness of about 0.06 inch to a final thickness of about 0.03 inch. Between passes the plates were reheated to about 100° C. This compaction was accompanied by an increase in electrical capacity of about 3 ampere hours per cubic inch.

To further illustrate that the beneficial increase in volumetric capacity may be obtained by other methods of compaction, duplicate positive electrodes were prepared by the processes described above. The first plate was cold rolled dry to a final thickness of 0.027 inch, being heated between passes. The volumetric plate capacity measured after compaction was 2.4 ampere hours per cubic inch. The second plate was dipped in a solution consisting of 20% methanol and 80% water and rolled while wetted with the liquid, to a final thickness of 0.024 inch. The somewhat greater compaction resulted in a volumetric capacity of 2.6 ampere hours per cubic inch, but in both instances the plate capacity was found to have increased substantially more than an amount attributable to the decrease in volume.

Compaction of plates wetted with other liquids produced similar results. Duplicate plates, prepared as described above, were wetted with solutions consisting of 25% methanol in water and 25% KOH in water, respectively, and then compacted by rolling while wetted with said solutions. The respective volumetric capacities so obtained were 3.4 ampere hours per cubic inch and 3.6 ampere hours per cubic inch after the plate thicknesses were reduced to 0.027 and 0.028 inch.

From the foregoing it will be seen that in wet rolling, electrolyte solutions as well as water containing a wetting agent may be used with almost equally beneficial results. It would appear that the amount of compaction is of great importance and that final plate thicknesses of about 60 to 80% of the original plate thickness yield optimum benefits.

In choosing the liquid by which the plate was wetted during rolling a particular advantage was found to be obtained by using the electrolyte adapted to use with the selected electrodes because this yielded a product with a maximum electrical output on first cycle as compared with plates prepared otherwise than by wet rolling with electrolyte and which did not reach maximum output until after as many as 3 cycles.

I claim:

1. In a method of manufacturing electrodes for secondary batteries wherein a metallic grid is encased in a mixture containing chemically active and electrically conductive constituents and thermoplastic resinous polymer, by applying a slurry of said materials to said metallic grid and thereafter effecting removal of liquid from the resulting coated grid, thereby distributing said polymer as solid particles disseminated throughout said grid-encasing composition and producing a self-supporting coherent plate then suitable for use in a secondary battery without further processing, except for trimming to finished size; the improvement which comprises: increasing the electrical capacity of the otherwise completed plate electrode consisting of the slurry encased grid by wetting said electrode with a liquid, heating the electrode and compressing the wetted, heated plate electrode prior to trimming, said compression being sufficient to diminish the thickness of said electrode to between 50% and 90%, of the thickness of said electrode prior to said wetting, heating, and compression.

2. The method of claim 1 wherein the wetting and heating are accomplished simultaneously by wetting with a heated liquid.

3. The method of claim 1 wherein the liquid with which the plate is wetted is an electrolyte intended to be used with the completed plate electrode.

4. The method of claim 1 wherein the compression diminishes the thickness to between about 60% and 80% of the thickness before compression.

5. The method of claim 1 wherein the compression is effected between opposed rolls.

6. The method of claim 1 wherein the electrode comprises a metal grid encased in a mixture of cadmium and cadmium oxide distributed throughout the thermoplastic resinous polymer.

7. The method of claim 1 wherein the electrode comprises a metal grid encased in an electrically conductive plastic having a metallic salt selected from the group consisting of metallic hydroxides and hydrated metal oxides, distributed throughout the thermoplastic resinous polymer.

References Cited in the file of this patent

UNITED STATES PATENTS

| | | |
|---|---|---|
| 1,450,533 | Williams | Apr. 3, 1923 |
| 2,544,112 | Schneider | Mar. 6, 1951 |
| 2,681,375 | Vogt | June 15, 1954 |
| 2,830,108 | Peters | Apr. 8, 1958 |
| 2,832,813 | Peters | Apr. 29, 1958 |
| 2,902,530 | Eisen | Sept. 1, 1959 |
| 2,920,128 | Scheichl | Jan. 5, 1960 |